Patented May 1, 1951

2,551,027

UNITED STATES PATENT OFFICE 2,551,027

DINITRONAPHTHENES

Robert W. Long, San Pedro, Calif., assignor to Union Oil Company of California, Los Angeles, Calif., a corporation of California No Drawing. Application December 9, 1946, Serial No. 715,137

8 Claims. (Cl. 260—644)

This invention relates to a new composition of matter, 1,2-dinitrocyclohexane, and to the use of this and related dinitronaphthenes as pest controls.

In the reaction of cyclohexane with nitric acid or nitrogen tetroxide for the preparation of nitrocyclohexane or adipic acid or the like, it has been found that 1,2-dinitrocyclohexane may be prepared. For example, in the methods of reacting cyclohexane with nitric acid or nitrogen tetroxide described in copending applications Serial Nos. 512,796, now abandoned, 591,568, now Patent No. 2,459,690, and 641,002, now Patent No. 2,465,974, it has been found that 1,2-dinitrocyclohexane is formed. This product is also formed in other methods of reacting cyclohexane with nitric acid or nitrogen tetroxide (including nitrogen dioxide in the latter term), whether liquid phase or vapor phase, in the temperature range of about 50° C. to 300° C. and pressure range about one to about 100 atmospheres, contact time range between about .01 second to 10 hours, and ratio of cyclohexane to nitrating agent between about 0.1 to 1 and 10 to 1. Preferably, however, the reaction is carried out in the liquid phase, within the temperature range of about 70° to 130° C., a pressure range within about 5 to 30 atmospheres, time of contact between about one second and one hour and ratio of cyclohexane to nitrating agent between about 0.1 to 1 and 1 to 1, nitric acid of concentration greater than about 40% being the preferred nitrating agent.

1,2-dinitrocyclohexane may also be prepared by reacting nitrocyclohexane with a nitrating agent. In general the reaction conditions are as given above for the nitration of cyclohexane. However, the use of nitrogen tetroxide as the nitrating agent is preferred in this case.

As a specific example of the preparation of 1,2-dinitrocyclohexane according to this invention, cyclohexane was reacted with 70% nitric acid in a 25% Cr, 12% Ni stainless steel reactor substantially as described in copending application Ser. No. 591,568 in a series of runs employing feed rates between about 11 and 17 ml. per minute of cyclohexane, and molal ratios of nitric acid to cyclohexane between about 3 to 1 and 5 to 1. The temperatures in the reactor were maintained between about 70° C. and 130° C. and the pressures between about 3 and 7 atmospheres. The contact times were estimated to be between about 20 and 40 minutes. The oil phase of the product in each case was fractionally distilled at atmospheric pressure to take overhead the unreacted cyclohexane and lighter materials, and the remainder was distilled at reduced pressure (10 mm. Hg) to about 130° C. vapor temperature to take overhead the nitrocyclohexane and lower boiling materials. The crude dinitrocyclohexane residues remaining from these low pressure distillations were composited and distilled under higher vacuum. Two distillate fractions were obtained, the first boiling between about 60° C. at 0.1 mm. Hg and about 100° C. at 0.3 mm. of Hg and constituting primarily a liquid dinitrocyclohexane mixture having a refractive index of about 1.48, and the second being a 1,2-dinitrocyclohexane heart cut boiling between about 100° C. and 120° C. at a pressure of approximately 0.3 mm. of Hg. The latter heart cut, constituting approximately 40% of the crude dinitrocyclohexane residue, was subjected to crystallization to recover crude 1,2-dinitrocyclohexane crystals therefrom, using various methods of crystallization as described below. The crude crystals were recrystallized from alcohol to obtain a total yield of about 33% of the heart cut or about 13% of the crude dinitrocyclohexane residue of pure 1,2-dinitrocyclohexane having the characteristics shown below:

Properties of 1,2-dinitrocyclohexane (1) Elemental analysis:
- Nitrogen (Dumas) .. 15.8
- Carbon _____ 42.3
- Hydrogen _____ 6.1
- Oxygen (by difference) _____ 35.8

(2) Molecular weight:
(Boiling point elevation method) _____ 176

(3) Melting point _____ 46.4° C.

(4) Solubility:
- Ether _____ Soluble
- Acetone _____ Soluble
- Paraffinic naphtha, $C_6$ and $C_7$ range ___ Low solubility
- Benzene _____ Soluble
- Cyclohexane _____ Low solubility
- Water _____ Insoluble
- Alcohol _____ Moderate solubility
- 10% to 50% caustic solutions _____ Soluble (5) $N_D^{20}$ of supercooled liquid _____ 1.4843

Proof that the above compound was 1,2-dinitrocyclohexane lies in the fact that the calculated values of elemental analysis and molecular weight agree closely with those found above. Thus the calculated molecular weight of 1,2-dinitrocyclohexane is 174 and the per cent nitrogen, carbon, hydrogen and oxygen respectively are 16.1, 41.3, 5.8 and 36.8 respectively. Furthermore on chemical reduction with tin and hydrochloric acid a water soluble diamine was formed, which was isolated by extraction with chloroform and condensed with benzil by heating in an alcoholic solution to give a pale yellow crystalline compound having an uncorrected melting point of 168.5° C. This agrees with the melting point (167° to 169° C.) given in Beilstein's Handbuch der Organischen Chemie for 2,3-diphenyl-5,6,7,8,9,10-hexahydroquinoxaline which had been formed by reacting 1,2-cyclohexanediamine with benzil.

As mentioned above various methods of crystallization of the 1,2-dinitrocyclohexane from the heart cut distillate of the above vacuum distillation may be employed. Mere standing of this at room temperature for a period of a week or more will result in growth of a substantial crop of crystals. Chilling to subatmospheric temperatures in the region of −40° C. or lower improves the yield, and seeding with crystals of preformed 1,2-dinitrocyclohexane improves the rate of crystal growth. It has also been found advantageous to use a solvent to dissolve the 1,2-dinitrocyclohexane-containing fraction, and to cool the solution in a Dry Ice-acetone bath. This speeds up the process from a matter of weeks to a matter of hours, i. e. in two hours substantially all the crystallizable dinitrocyclohexane may crystallize. As solvents we may employ ethyl ether, isopropyl ether, isopropyl alcohol, butyl alcohol, other alcohols or ethers, or preferably mixtures of these with light hydrocarbons such as pentanes, hexanes, cyclohexane and the like. In general solvents may be employed which boil at temperatures below about 140° C. at atmospheric pressure, and which will not themselves freeze at the temperatures of crystallization employed. Preferably their melting points should be below −70° C., and their viscosities should be low at the temperature of crystallization employed. The proportions of solvent to crude material will generally be in the range of one to one up to about 10 to 1, though higher and lower proportions may be used.

In all of the above methods of crystallization except the one involving mere standing at room temperature, it has been found that the crude dinitrocyclohexane residue from the distillation of the nitration reaction product to remove the mononitrocyclohexane and lower boiling materials, may be employed directly, without segregation of the heart cut by vacuum distillation as described above. The vacuum distillation is helpful in giving a crude crystalline product which is somewhat purer, but care must be exercised in the distillation to keep the temperature below about 145° C. since at temperatures appreciably above 145° C. decomposition may take place with such rapidity that there is danger of an explosion. Rapid distillation is also desirable to minimize decomposition. A short distillation column is all that is necessary, the column in the specific example being only about two inches in height. It is preferable to eliminate the distillation however, and use the crude dinitrocyclohexane residue together with a solvent as described above, the preferred solvents being mixtures of oxygenated solvents as shown, with about 10% to about 50% of a hydrocarbon solvent.

As an example of a crystallization of 1,2-dinitrocyclohexane according to this invention, 100 ml. of the above crude dinitrocyclohexane residue, i. e., the reaction product of cyclohexane and a nitrating agent, distilled to eliminate the material boiling below about 130° C. at 10 mm. Hg pressure, was diluted with 125 ml. of a pentane fraction of petroleum and 375 ml. of ethyl ether. Immediately upon mixing, a small amount of sludge was formed and this was removed by filtration. The filtrate was then cooled in a Dry Ice-acetone bath to a temperature of about −70° C., and was seeded with a small amount of glass wool that had been treated with 1,2-dinitrocyclohexane dissolved in ethyl ether and dried. Crystal growth was very rapid, and substantially complete within about two hours. The crystals were separated by decantation of the mother liquor. These crude crystals were recrystallized once by dissolving them in 100 ml. of a mixture of pentanes and ethyl ether in the above proportions and again cooling in the Dry Ice-acetone bath. After separation of these crystals from the mother liquor, an additional small crop of crystals was obtained from the mother liquor by addition of 20 ml. of the pentanes and again cooling.

The method of seeding employed in the above example, i. e., soaking glass wool in a solution of 1,2-dinitrocyclohexane, drying the thus treated glass wool, and using it as the seeding nucleus, has been found especially useful in this process. It is highly desirable to use this technic especially in combination with the use of the solvent as described.

The preparation of the 1,2-dinitrocyclohexane of this invention is not limited to the method of the above specific example, since it may also be prepared by the nitration of cyclohexane at other temperatures, pressures, etc., and by the use of other nitrating agents, or nitration of mononitrocyclohexane, all as described previously. The crude dinitrocyclohexane residue remaining after the removal of mononitrocyclohexane and lower boiling materials is a liquid consisting essentially of mixed dinitrocyclohexanes, although there may be small amounts of trinitrocyclohexanes and other polynitrocyclohexanes present. The 1,2-dinitrocyclohexane may be separated from this liquid residue by the methods described above.

The 1,2-dinitrocyclohexane prepared as above has been found exceptionally useful not only as a chemical intermediate for the production of various other chemical derivatives, but also as a pest control, useful for example on insects, fungi and bacteria. In the application of the 1,2-dinitrocyclohexane as a pest control, any of the usual methods may be employed; i. e., it may be used as a fumigant, as a contact poison, or as a stomach poison and in the form of a vapor, liquid or solid.

As an example of the use of 1,2-dinitrocyclohexane as a stomach poison, tomato leaves were dipped into suspensions of the indicated concentrations in water and fed to variegated cut worm larvae, second instar larvae of *Lycophotia margaritosa*. As shown in the following tabulation, substantially all of the larvae were killed within forty-eight hours.

| Conc./100 ml. of water | Per cent Mortality | |
|---|---|---|
| | 24 hrs. | 48 hrs. |
| Gm. | | |
| 1.0 | 70.0 | 95.0 |
| 0.5 | ------ | 85.0 |
| 0.25 | 40.0 | 75.0 |

As a comparison, a suspension of a commercial DDT wettable powder containing 50% of DDT (2,2-bis-parachlorophenyl 1,1,1-trichloroethane) gave only a 69.8% mortality in twenty-four hours and a 93% mortality in forty-eight hours, even though employed in double the highest concentration used for the 1,2-dinitrocyclohexane, i. e., two grams per 100 ml.

In the above instance it is probable that a good proportion of the kill in the case of the 1,2-dinitrocyclohexane was accomplished by mere contact, since only a small proportion of the leaves were consumed by the larvae. In fact in the higher concentrations substantially none of the leaves which had been treated with the 1,2-dinitrocyclohexane were consumed. Thus the 1,2-dinitrocyclohexane appears to have a definite repelling or immunizing action on the organic matter as well as a contact action and stomach poison action on the pest.

As an example of the efficacy of the 1,2-dinitrocyclohexane as a contact poison, suspensions of 1,2-dinitrocyclohexane in water in concentrations between 0.25 gm. per 100 ml. and 1.0 gm. per 100 ml. were prepared, and these were sprayed on potted eggplant and lima beans infested with mixed cultures of European red mite (*Paratetranychus pilosus*) and two-spotted mites (*Tetranychus bimaculatus*). Twenty-four hours after treatment at the lowest concentration 96% of the mites were dead, and 100% mortality was found for concentrations greater than 0.5 gm. per 100 ml. Similarly, a suspension having a concentration of 1.0 gm. per 100 ml. of water was sprayed on adult milkweed bugs, *Oncopeltus fasciatus*, with a mortality of 100% within 18 hours. The rate of killing in this case was considerably greater than that obtained with the above described DDT powder, also applied as a suspension of similar concentration of DDT.

Another test was conducted in which the 1,2-dinitrocyclohexane was employed as a powder, mixed with an equal weight of an inert diluent consisting essentially of aluminum silicate, and marketed commercially. This powder was therefore comparable in concentration with the above DDT powder. The 1,2-dinitrocyclohexane powder and the DDT powder were each diluted with above diluent to concentrations of 1, 2, 4, and 8% by weight. These preparations were tested on adults of the large milkweed bug as follows:

In applying the test preparations, 0.50 gm. of material was sifted onto ten bugs contained in a glass culture dish 15 cm. in diameter. After dusting, the bugs were removed to a clean culture dish and held for observation at 75° F. and 50% relative humidity. Three replicates of ten bugs each were employed in each trial. The results are given in the following table:

| Concentration, per cent by weight | Per cent Mortality | |
|---|---|---|
| | 2 hrs. | 5 hrs. |
| 1,2-dinitrocyclohexane: | | |
| 1.0 | 0.0 | 30.0 |
| 2.0 | 0.0 | 50.0 |
| 4.0 | 35.0 | 70.0 |
| 8.0 | 40.0 | 90.0 |
| DDT: | | |
| 1.0 | 0.0 | 10.0 |
| 2.0 | 0.0 | 0.0 |
| 4.0 | 0.0 | 15.0 |
| 8.0 | 0.0 | 5.0 |

This comparison is even more favorable to the 1,2-dinitrocyclohexane when it is considered that powders are notably more effective if mixed with a wetting agent and finely ground, and the DDT powder contained a wetting agent and was ground to a much finer size than the 1,2-dinitrocyclohexane powder, and the latter was used without a wetting agent.

The 1,2-dinitrocyclohexane may be employed in any conventional manner as a poison for pests. Other modes of employment are for example mixing in the soil as a soil fumigant; mixing with a sticky matrix and setting the matrix around a tree to act as a repellant; dissolving the 1,2-dinitrocyclohexane in a solvent spray oil and applying the spray oil to plants, fruits, etc. as such or as an emulsion with water. It may also be used in admixture with other pesticides, in which its rapid action is very helpful. Investigations of the phytocidal characteristics of 1,2-dinitrocyclohexane indicate that the effect on plants such as tomato, squash and Swiss chard is negligible, providing concentrations not substantially in excess of one gram per 100 ml. of water or other carrier are employed.

In the formulation of pesticides containing the dinitronaphthenes of this invention, of course inert materials, solvents, emulsifiers, spreaders, wetting agents, etc. may be employed, as known in the art.

Although the above discussion has been concerned entirely with the 1,2-dinitrocyclohexane, which is the preferred pesticide of this invention, it has been found that other related dinitronaphthenes are also effective. For example, the crude dinitrocyclohexane residue remaining after the distillation of the mononitrocyclohexane and lighter from the nitration process as described above, has also been found to be very effective as a pesticide, in tests similar to those described above for the 1,2-dinitrocyclohexane. Similarly, the liquid remaining after removal of the 1,2-dinitrocyclhexane from the heart cut, and also the distillate fraction taken overhead in the distillation of the crude dinitrocyclohexane residue prior to distillation of the heart cut from which the 1,2-dinitrocyclohexane was obtained, were both also found to have excellent pesticidal characteristics. Thus, these three fractions were tested as fumigants, using adults of the flour beetle *Tribolium confusum*. In the tests, 0.2 ml. of the liquid fraction was placed in a small open Petri dish placed inside a closed culture dish having a capacity of about 850 cc. Twelve bugs were placed in each culture dish, outside the Petri dish, so as to be exposed only to diffused vapors. After twenty-four hours of such exposure in the closed dishes, the dishes were opened and a revival period of twenty-four hours allowed before counting the mortality. Average results of three replicates of each test showed a 40% mortality for the crude dinitrocyclohexane residue, and a 100% mortality for each of the two liquid distillate fractions.

By carrying out the above nitration with naphthenes other than cyclohexane in the manner described above, dinitronaphthenes other than dinitrocyclohexanes may be obtained. For example, cyclopentane may be nitrated under the above conditions to yield a mixture of a mononitro- and dinitrocyclopentanes, and upon separating the mononitro-compounds and more volatile materials, a residue of crude dinitrocyclopentanes may be obtained, from which 1,2-dinitrocyclopentane may also be recovered by the methods employed for 1,2-dinitrocyclohexane above. Both the crude dinitrocyclopentanes and the 1,2-dinitrocyclopentanes are effective when employed as pesticides as above. Similarly, by nitration of other naphthenes such methylcyclopentane, methylcyclohexane, dimethylcyclopentane, and other naphthenes, preferably those having not more than about 10 carbon atoms, crude dinitronaphthene residues may be obtained by removal of the mononitronaphthenes and lower boiling materials substantially as described, and from these crude dinitronaphthene residues, 1,2-dinitronaphthenes, i. e. those having the nitro substituent groups on adjacent carbon atoms on the ring, may be separated by crystallization. Thus, in the nitration of methylcyclopentane and methyl cyclohexane under the conditions shown above, 1,2-dinitro-3-methylcyclopentane and 1,2-dinitro-3-methyl cyclohexane respectively, may be prepared, and are useful as pesticides when used as above. The crude dinitronaphthene residues may also contain 1,3-dinitro- or 1,4-dinitronaphthenes, i. e., dinitronaphthenes in which the carbon atoms to which the nitro groups are attached are on the ring and are separated by one or two carbon atoms, and the crude dinitronaphthene residues or 1,3-dinitro- or 1,4-dinitronaphthenes or mixtures of dinitronaphthenes may also be used as pesticides as described, but the 1,2-dinitronaphthenes are in general preferred because of their greater stability, and excellent toxicity.

Although pure naphthenes are preferred for the nitration, mixed naphthenes, or petroleum fractions containing predominantly naphthene hydrocarbons in admixture with other hydrocarbons such as isoparaffins, may be used.

Other modifications of the invention which would be apparent to one skilled in the art are to be included in the scope of the invention as defined in the following claims.

I claim:

1. 1,2-dinitrocyclohexane having melting point of approximately 46.4° C.

2. A composition containing as the essential active material, a nitrocycloalkane selected from the group consisting of 1,2-dinitrocyclohexane, 1,2-dinitrocyclopentane, 1,2-dinitromethyl cyclopentane, and 1,2-dinitromethyl cyclohexane.

3. A composition containing as the essential active component 1,2-dinitro-3-methyl cyclohexane.

4. A composition containing as the essential active component 1,2-dinitrocyclopentane.

5. A composition containing as the essential active component 1,2-dinitro-3-methylcyclopentane.

6. A method for preparing 1,2-dinitrocyclohexane which comprises contacting cyclohexane with a nitrating agent at a temperature between about 50° C. and 300° C., distilling from the product all the materials boiling below about 130° C. at 10 mm. Hg pressure, dissolving the residue in a solvent having a boiling point not over about 140° C. and a freezing point of not over about $-70°$ C. chilling the solution to a temperature below about $-40°$ C., and seeding the solution with crystals of 1,2-dinitrocyclohexane, thereby crystallizing 1,2-dinitrocyclohexane from the solution.

7. A method according to claim 6 in which the seeding is accomplished by depositing 1,2-dinitrocyclohexane uniformly on a glass wool matrix and dipping the so-treated matrix in the crystallizing solution.

8. A method according to claim 6 in which the solvent is a mixture of an oxygenated organic solvent and a hydrocarbon.

ROBERT W. LONG.

REFERENCES CITED

The following references are of record in the file of this patent:

UNITED STATES PATENTS

| Number | Name | Date |
|---|---|---|
| 2,224,723 | Ellis | Dec. 10, 1940 |
| 2,228,261 | Ellingboe | Jan. 14, 1941 |
| 2,332,491 | Senkus | Oct. 19, 1943 |
| 2,335,384 | Bousquet | Nov. 30, 1943 |
| 2,343,534 | Cavanaugh et al. | Mar. 7, 1944 |
| 2,420,938 | Doumani et al. | May 20, 1947 |
| 2,423,180 | Doumani et al. | July 1, 1947 |

OTHER REFERENCES

J. Econ. Entomology, vol. 33, No. 4, Aug. 1940, pages 670–674.